MULTI-TRACK MESSAGE RECORDING APPARATUS

Filed July 26, 1965

WITNESSES:
Bernard R. Gieguey
James F. Young

INVENTORS
Irving E. Lempert &
David Sillman.
BY Samuel Ozhi
ATTORNEY

United States Patent Office 3,427,408
Patented Feb. 11, 1969

3,427,408
MULTI-TRACK MESSAGE RECORDING APPARATUS

Irving E. Lempert and David Sillman, Metuchen, N.J., assignors to Westinghouse Electric Corporation, Pittsburgh, Pa., a corporation of Pennsylvania
Filed July 26, 1965, Ser. No. 474,750
U.S. Cl. 179—100.2 2 Claims
Int. Cl. G11b 5/02

ABSTRACT OF THE DISCLOSURE

A message recording and playback system is disclosed which utilizes a continuous loop of tape having a plurality of recording tracks thereon. Multi-track playback-record and erase heads are provided so that individual messages may be recorded on each of the tracks of the tape. A separate indication, such as the lighting of an indicator lamp, is given a message that has been recorded on a given one of the tracks. After a message has been recorded, the tape is recycled to the beginning of the originally recorded message so that a subsequent user of the system can retrieve the message from the proper track. When the playback portion of the system is activated for retrieving the recorded message, the indicator lamp is turned off.

Figures 1, 2:
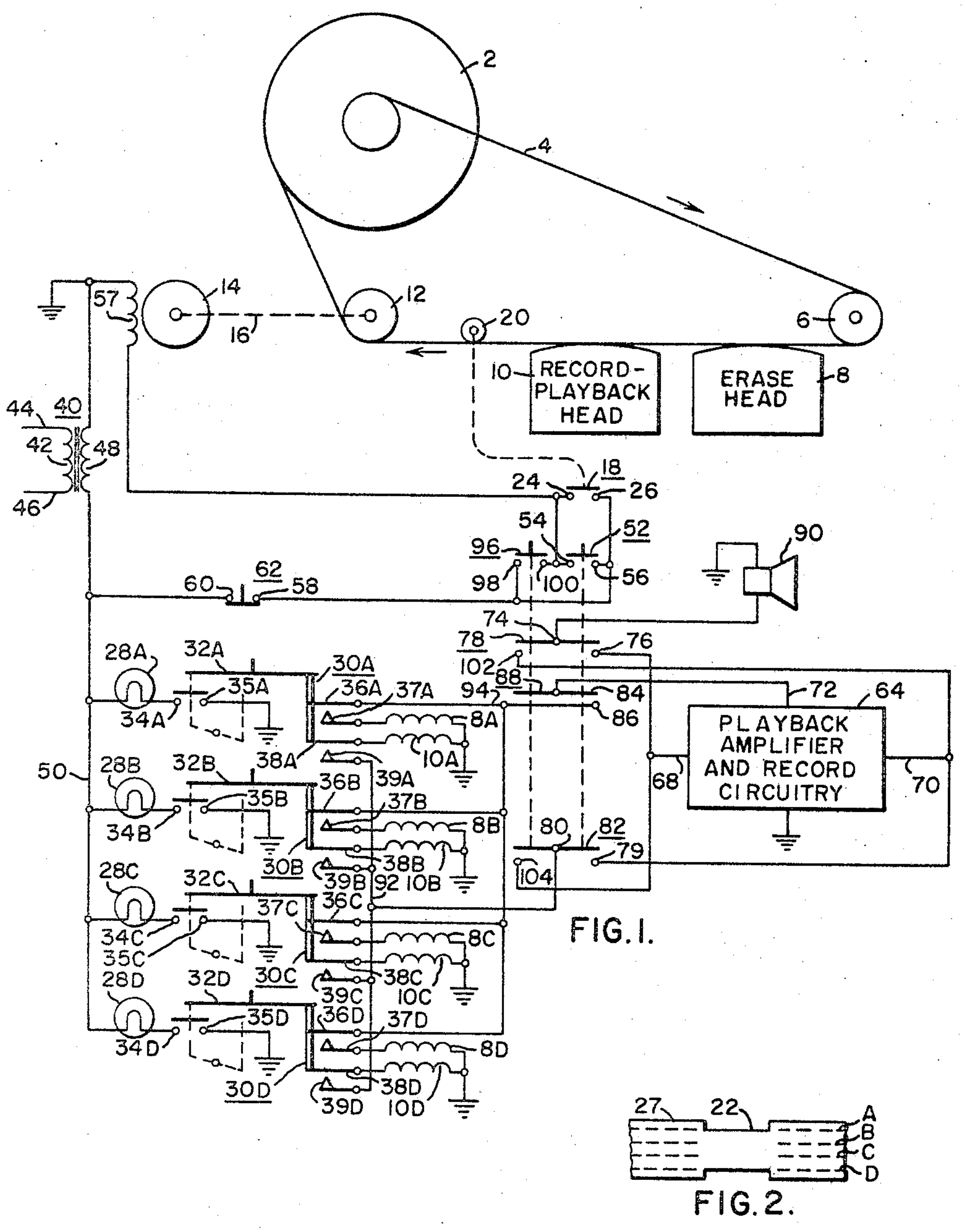

The present invention relates to recording and playback apparatus utilizing continuous loop tape recorders, and more particularly to message recording and playback apparatus in which a plurality of separate messages may be independently recorded and played back from a continuous tape loop.

In copending application Ser. No. 402,197, filed Oct. 7, 1964 and assigned to the same assignee as the present application, message recording apparatus is described in which a message may be recorded on a continuous loop of magnetic recording tape. The continuous loop of tape automatically resets itself at the beginning of the recorded message, with a visual indication being provided that a message has been recorded. The recorded message may then be replayed to retrieve the original message. A disadvantage of the such a system is that once a message is recorded and is in a reset state for replay no other messages may be recorded until the original message has been either replayed or erased. Also, when there are a number of users of a recording device of this type, one is not able to determine for whom a recorded message is intended and message may thus be played back by the wrong party. These above disadvantages may result in the recording apparatus not being utilized because of the presence of a previous message or the message being not received by the intended party.

It is, therefore, an object of the present invention to provide new and improved message and recording apparatus wherein a plurality of separate messages may be recorded and individually retrieved.

It is a further object of the present invention to provide new and improved message recording and playback apparatus wherein a plurality of messages may be recorded on separate channels and with the apparatus automatically resetting itself at the beginning of each of the individual messages.

It is a further object of the present invention to provide new and improved message recording and playback apparatus in which a plurality of individual messages may be recorded and individually played back, with an indication being provided to show in which channel a message has been recorded.

In its broad context, the present invention provides new and improved message recording playback apparatus utilizing a continuous loop of tape having a plurality of recording tracks. Multi-channel playback-record and erase heads are used so that individual messages may be recorded on the separate tracks of the tape. A separate indication is provided for each track to show which track has a message recorded thereon. After a message has been recorded on a given track, the tape is recycled to the beginning of the originally recorded message so that the message may be retrieved from that channel when desired.

These and other objects and advantages of the present invention will become more apparent when considered in view of the following specification and drawings, in which:

FIGURE 1 is a block-schematic diagram of the multichannel message recording and playback apparatus of the present invention; and FIG. 2 is a frontal view of a portion of the continuous tape as utilized herein showing the origin portion.

In FIGURE 1, the present invention is shown including a continuous loop tape deck which includes a single spool of tape 2 from which a continuous loop of tape 4 is formed. The tape may comprise a magnetic tape which is well known and commonly used in tape recorders. The tape 4 is drawn from the center of the spool 2 and is passed over a pulley 6 to traverse by an erasing head 8 and a playback-record head 10. The tape 4 is driven by a capstan 12 to be rewound around the outside periphery of the spool 2. The capstan 12 is driven by a drive motor 14 through a mechanical linkage 16. The activation of the motor 14 causes the tape 4 to be driven in a clockwise direction, as indicated by the arrows with the tape being pulled from the center of the spool 2 and being rewound about the outside periphery thereof.

The continuous loop of tape 4 has a predetermined origin point with respect to the record-playback head 10. This origin point is positioned by a reset switch 18, which may comprise a microswitch. The switch 18 includes a trip lever 20 which moves in a plane perpendicular to the plane of FIG. 1 and which is operative for making and breaking contact. The trip lever 20 rides over the edge of the tape 4 and engages a cutout portion 22 of the tape at the origin point, see FIG. 2. When the trip lever 20 engages the cutout portion 22, the switch 18 will be set to its open position between a pair of terminals 24 and 26 of the switch 18. When, however, the trip lever 20 engages the regular width portion 27 of the tape 4, the switch 18 will close to complete a circuit between the terminals 24 and 26. Thus, each time the trip lever 20 engages cutout portion 22 of the tape 4 at the end of each cycle of rotation of the spool of tape 4 the switch 18 will be opened. Therefore, at the end of each cycle of rotation the tape will be positioned at the same origin point. It should be noted nonetheless that other methods of positioning the tape with respect to the record-playback head 10 could, of course, be utilized as well as the apparatus indicated, such as by electrical or mechanical means or by other indicia on the tape itself.

Assume initially that no messages are recorded on any of tracks A, B, C or D of the tape which is positioned at its origin point and further assume that all the switches shown in FIG. 1 are in the state as shown. In order to record a message, the particular track A, B, C or D of the tape must first be selected. The record-playback head 10 is of the multi-track variety. In the present case there would be four separate record-playback transducers incorporated into the head. Similarly the erase head would include an individual erasing head for each of the four tracks. Alternately, of course, several record-playback or erase heads could be utilized or a single head could be moved into position adjacent the particular track to be recorded. The essential functional is that a record-playback and an erase head be selectively operative to record or playback and erase a selected track of the tape. In the present example, a four-track playback record head and a four-track erase head is shown.

Associated with the erase head 8 are four erase windings 8A, 8B, 8C and 8D, which are shown schematically in FIG. 1 disposed away from the erase head. However, in actuality the erase windings would be disposed within the erase head adjacent to the respective tracks A, B, C and D of the tape 4. The record-playback head 10 has associated therewith four playback windings 10A, 10B, 10C and 10D, which are shown away from the record-playback head 10 but in an actual embodiment would be disposed within the head adjacent to the tape 4 so that the individual windings would respectively either apply information to the tape or retrieve information therefrom. Four indicator lights 28A, 28B, 28C and 28D are provided to indicate which channel has been selected to have a message recorded therein. The indicator lights 28A, 28B, 28C or 28D will remain energized until the message recorded in that channel will have been played back. The indicator lights for example may comprise small incandescent light bulbs. After a message has been recorded in any of the tracks A, B, C or D, other messages may be recorded into the other tracks without affecting the already recorded message or the indication provided by its respective indicator light as will be explained below.

In order to record a message on one of the tracks A, B, C or D, the respective playback record winding 10A, 10B, 10C or 10D and the respective erase winding 8A, 8B, 8C or 8D must be energized. Four switches 30A, 30B, 30C and 30D are provided for this function as well as energizing the particular indicator light 28A, 28B, 28C or 28D. Each of the switches 30A, 30B, 30C or 30D includes a movable plunger element 32A, 32B, 32C and 32D, respectively, and also three sets of contacts which are operable to be closed by the respective movable plungers. Each of the switches 30A, 30B, 30C and 30D includes, respectively, a set of indicator contacts 34A–35A, 34B–35B, 34C–35C and 34D–35D; a pair of erase contacts 36A–37A, 36B–37B, 36C–37C and 36D and 37D; and a pair of record-playback contacts 38A–39A, 38B–39B, 38C–39C and 38D–39D.

Power for the circuitry of FIG. 1 is supplied through a power supply transformer 40 including a primary winding 42 having input terminals 44 and 46 to which a source alternating potential is to be applied, which for example may be 120 volts, 60 cycles. The transformer 40 includes a secondary winding 48 which has one end grounded and the other end connected to each of the indicator lights 28A, 28B, 28C and 28D through a lead 50. The other end of the indicator lights 28A, 28B, 28C and 28D are connected, respectively, to the contacts 34A, 34B, 34C and 34D. The other contact of the indicator set 35A, 35B, 35C and 35D are grounded. By closing the respective switch 30A, 30B, 30C or 30D the respective indicator contacts will close to provide a circuit path from the secondary winding 48 through the indicator light to illuminate the selected indicator light 28A–28B. The switches 30A–30D are so designed that the contacts 34A–35A, 34B–35B, 34C–35C, 34D–35D will close and open on alternate actuation of the respective plunger members 32A–32D. This permits a selected indicator light 28A–28C to remain illuminated until that channel is selected for playback. The closure of one of the switches 30A–30D through the action of the movable plunger, 32A–32D will also insert the respective erase windings 8A–8D and the respective record-playback windings 10A–10D into the circuit as will be explained below.

Thus, with the particular one of the tracks A, B, C or D being selected, the apparatus is setup for the recording of a message on the selected one of the tracks. The record operation is instigated by pressing a record button 52 which engages a pair of contacts 54 and 56 to a short circuit across the switch 18. By the closure of the record switch 52 a completed electrical circuit is provided through a winding 57 of the motor 14 to energize the motor 14. The electrical circuit is provided starting at ground, at which one end of the winding 57 is connected, through the winding 57 to the contacts 54–56, through a pair of normally closed contacts 58–60 of a hold switch 62 to the lead 50, to the ungrounded end of the secondary winding 48 of the power supply transformer 40. The energization of the motor 14 causes the capstan to be rotated through the mechanical linkage 16 so that the tape 4 is rotated away from its origin point 22. The resetting switch 18 closes once the tape moves past its origin point 22 to provide a completed circuit to the winding 57 at that time so that the record switch 52 may be released.

The closing of the record switch 52 also operates to insert playback amplifier and record circuitry which is shown by the block 64 in FIG. 1. The tape playback amplifier and record circuitry may comprise such circuitry as is well known in the tape recorder art to accomplish the record and playback operations. The tape playback amplifier and record circuitry has its input at a lead 68 and an output at a lead 70, with an erase signal being developed at a lead 72. The closing of the record switch 52 causes the record operation to be set up by the closing therewith of a pair of contacts 74–76 of a switch 78; the closing of a pair of contacts 79–80 of a switch 82; and the closing of a pair of contacts 84–86 of an erase switch 88. The switches 78, 82 and 88 being so closed audio information may be supplied through a transducer 90 which may comprise both a microphone and speaker assembly. However, of course, the microphone and speaker may be separate elements in the present apparatus. The audio information is then applied through the transducer 90, to the switch 78 in its record position to the input 68 of the circuitry 64. From the output 70 of the circuitry 64, the information to be recorded is then applied through the switch 80 in its record position to a lead 92 which is connected to the contacts 39A, 39B, 39C and 39D. With one of the switches 30A–30D having been previously selected, a closed circuit will be provided from one of the contacts 39A–39D through one of the contacts 38A–38D to a respective one of the playback-record head windings 10A–10D. The audio information supplied at the transducer 90 will thus be recorded on the magnetic tape 4 by the well known process at a point subsequent to the origin point 22 of the tape 4.

The tape 4 is erased prior to passing by the record playback head 10 since the respective erase winding 8A–8D is inserted into the circuit by the activation of the selected switch 30A–30D. An erase signal is applied from the erase output 72 of the playback amplifier and record circuitry 64 at the output 72 through the switch 88 in its record position through a lead 94 which is commonly connected to the contacts 36A–36D. The closing of the selected switch 30A–30D will complete a circuit through the erase windings 8A–8D which have one end connected to contacts 37A–37D, respectively, and the other end grounded. Thus, the tape will be erased prior to audio information being applied through the record-playback head 10 to the tape 4.

As long as audio information is supplied to the transducer 90, the recording process will continue for the entire spool of tape 2. That is, until the origin portion 22 is again reached indicating the completion of one cycle of the tape. However, shorter messages may of course be recorded with the tape continuing to recycle itself to the origin point 22, since a circuit path is provided to the winding 57 of the motor 14 through the microswitch 18 as long as the tape is away from its origin portion 22. The switch mechanism constituting switches 52, 78, 82 and 88 is so designed that switches 78, 82 and 88 remain in the record position until such time as they are placed in playback position, as described below. However, switch 52 is closed only momentarily, while the record button is held down, or while the playback button is held down, as described below.

It should be noted that the indicator light 28A–28D remains in its energized state even though the recording process may have ended, to indicate to a viewer that a message has been recorded and in which channel the message has been recorded.

After the recording in a given one of the channels A, B, C or D, another of the channels may be recorded by going through a similar process, by first selecting the particular track desired by the pressing of the appropriate switch 30A–30D and then closing the record button 52. This will select the proper playback record head winding 10A–10D and the proper erase winding 8A–8D to permit recording in that track of the tape. An indication of this channel recording will be supplied independently of the other track recording so that a subsequent viewer may retrieve the original message.

In order to replay the massages previously recorded on any of the tracks A, B, C or D, it is only necessary to close the switch 30A–30D of the corresponding channel and to push a playback switch 96 which will close the circuit across a pair of contacts 98 and 100. The contacts 98 and 100 are closed momentarily to provide a short circuit across the contacts 24 and 26 of the switch 18 which will complete a circuit through the winding 57 of the motor; thereby energizing the motor 14 to drive the tape 4 across the record-playback head 10. Once the tape moves past its origin point 22 the switch 18 closes and the trip lever member 20 engages the normal width portion 27 of the tape 4. With the switch 18 closed the motor 14 will continue to have its winding 57 energized from the power supply. The closing of the switch 96 also causes the switch 78 to change to its playback position, with the contact 74 being connected to a contact 102. The switch 82 is also switched to the playback position with contact 80 being electrically connected to a contact 104. The switch 88 is so placed that the contacts 84 and 86 are disconnected so that no erase signals are applied to the respective erase windings 8A–8D. With the switches in the playback state as shown, originally recorded messages may be retrieved. The activation of the selected of the channel switches 30A–30D will cause the respective indicator light 28A–28D to be turned off, since the indicator switch contacts 34A–35A, 34B–35B, 34C–35C and 34D–35D are bistable in nature. That is, upon the first closing of a switch 30A–30D contacts will remain closed to energize an indicator light 28A–28D. However, once a given one of the switches 30A–30D is depressed, the corresponding record-playback winding contacts 38A–39A, 38B–39B, 38C–39C and 38D–39D remain closed until another of the channel switches 30A–30D is depressed. For example, if the switch 30B is originally closed first and a message is recorded thereon, the contacts 38B–39B will remain closed to keep the record-playback winding 10B in the circuit until another of the switches 30A, 30C or 30D is closed. If, for example, then the switch 30D is closed, the contacts 38D–39D will close while the contacts 38B–39B will then be opened. Thus, upon the closing of a selected one of the switches 30A–30D to retrieve the message therein, the corresponding indicator light 28A–28D will be deenergized while the corresponding record-playback winding 10A–10D will be inserted into the circuit. As the tape 4 moves by the record-playback head 10, the head will pick up the recorded magnetic information on the tape through its recording-playback winding 10A–10D. These signals will be then transmitted from windings 10A–10D to the lead 92 and then through the switch 82 in its playback position to the input lead 68 of the playback amplifier and record circuitry, 64. The information amplified therein appears at the output lead 70 and is applied through the switch 78 in its play position to the transducer 90 which will now operate as a speaker to produce audibly the original recorded message.

After the message has been retrieved, if there is an unused portion of the tape 4, the tape will be continued to be wound on the spool 2 until the origin portion 22 of the tape is reached. The trip lever 20 will then engage the origin portion 22 to open the switch 18 which will deenergize the winding 57 of the motor 14 to stop the rotation of the tape. If other messages had previously been recorded this would be indicated by continued illumination of one of the indicator lights 28A–28D. To retrieve this message, the process is repeated with the particular switch 30A–30D being depressed to deenergize the indicator light 28A–28D and to insert the desired record-playback winding 10A–10D into the circuit. The playback switch 96 is then depressed to start the operation of the playback mechanism.

The hold button 58, as discussed above, is connected in series between the power supply and the winding 57 of the motor. The switch is normally closed connecting the terminals 60 and 62. In order to stop the rotation of the tape 4 during either the playback or record operation, it is only necessary to depressed the hold button 58 which opens the contacts 60 and 62 to open circuit winding 57 of the motor 14 and thereby stop the rotation of the tape 4. To restart the tape the switch 58 is closed. The tape will then continue to rotate until reaching its origin portion 22 wherein the switch 18 will be opened by the operation described above to stop the rotation of the tape at its origin point.

The particular switching circuit shown herein is not intended to be all exclusive but is intended to be only exemplary. Many other combinations and types of switches could be utilized to bring about the desired operation of the described message recorder apparatus.

Although the present invention has been described with a certain degree of particularity, it should be understood that it has been made only by way of example and that numerous changes in the combination and arrangement of parts, elements, and components may be made without departing from the scope and the spirit of the present invention.

We claim as our invention:

1. Audio message recording and playback apparatus comprising: a continuous loop of recording tape whereupon individual messages can be recorded in a plurality of tracks; a record-playback element associated with each of said plurality of tracks for applying messages on the respective of said tracks and for retrieving recorded messages therefrom; track selection means for selecting a given of said tracks to record a message thereon by activating the associated record-playback element; indicator means associated with each of said tracks to be energized in response to a selection of a given of said tracks by said selection means; recording means for activating said loop of tape so that a message may be recorded on the selected of said tracks; reset means for positioning said loop of tape at the beginning of the previously recorded message loops, the respective indicator means remaining energized to indicate the presence of a recorded message on the selected track; said selection means being operative after a message has been recorded to select a track for replay and to deenergize the respective indicator means upon the instigation of the retrieval of the previously recorded message from the selected track; and playback means for actuating said loop of tape and for playing back the previously recorded message.

2. Audio message recording and playback apparatus comprising: a continuous loop of magnetic recording tape having a plurality of tracks whereupon individual messages can be recorded; a record-playback head including a plurality of record-playback windings, one of said record-playback windings being associated with one of said plurality of tracks for applying messages to the respective of said tracks and for retrieving recorded messages therefrom; an erase head including a plurality of erase windings, one of said erase windings being associated with one of said plurality of tracks to erase the respective of said tracks before a message is recorded on a selected track; track selection means for selecting a given of said tracks to record a message thereon by inserting into circuit relation the associated erase and record-playback windings; a visual indicator light associated with each of said tracks to be energized in response to a selection of a given of said tracks by said selection means; a drive motor for driving said continuous loop of tape by said erase and record-playback heads; recording means for activating said motor, said record-playback and erase heads so that a message may be recorded on the selected of said tracks; reset means for deactivating said motor at the beginning of the previously recorded message at the end of the cycle of said loop, the respective visual indicator light remaining energized to indicate the presence of a recorded message on the selected track; said selection means being operative after a message has been recorded to select a track for replay by inserting the selected record-playback winding and to deenergize the respective visual indicator light upon the instigation of the retrieval of the previously recorded message from the selected track; playback means for actuating said drive motor and said record-playback head for playing back the previously recorded message, said drive motor being reactivated in response to said reset means at the end of a cycle of said loop; and pause means for deactivating said drive motor at any point in the recording or playback operations.

References Cited

UNITED STATES PATENTS

Re. 23,112 5/1949 Squire ------------ 179—100.2

STANLEY M. URYNOWICZ, Jr., *Primary Examiner.*

J. R. GOUDEAU, *Assistant Examiner.*

U.S. Cl. X.R.

179—100.1